Patented May 13, 1952

2,596,141

UNITED STATES PATENT OFFICE 2,596,141

MONOALKYL DIPHENYL PHOSPHATE ESTERS

Harry R. Gamrath, St. Louis, and John Kenneth Craver, Webster Groves, Mo., assignors to Monsanto Chemical Company, St. Louis, Mo., a corporation of Delaware No Drawing. Application February 17, 1950,
Serial No. 144,862

11 Claims. (Cl. 260—461)

1

This invention relates to new esters of phosphoric acid, and more specifically, to certain monoalkyl diphenyl phosphate esters of the general formula

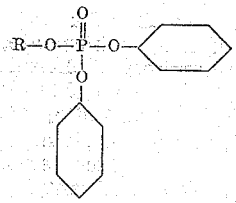

wherein R represents a branched chain alkyl radical terminating with a $CH_2$ group and containing at least 6 and not more than 18 carbon atoms.

The monoalkyl diphenyl phosphate esters of this invention are generally nearly colorless liquids having mild pleasant odors. These new esters have exceptional utility as flexibilizing plasticizers for polyvinyl chloride compositions, imparting to such plasticized compositions the properties of flexibility at freezing temperatures, low volatility losses of plasticizers at higher temperatures, and non-flammability.

Because of their very low pour point, high autogenous ignition temperatures and stability against decomposition, these monoalkyl diphenyl phosphates have been found to possess outstanding utility in the field of functional fluids where they are particularly useful as synthetic lubricants and force transmission fluids, having exceptionally high inherent lubricity. Furthermore, because of their compatibility with paraffinic hydrocarbon oils, these monoalkyl diphenyl phosphates may be combined with paraffinic hydrocarbon oils to prepare hydraulic and torque converter fluids of highly desirable characteristics. Moreover, these esters have a wide variety of other uses such as film-forming addition agents for extreme pressure lubricants and as the liquid medium for filters for air conditioning systems.

The monoalkyl diphenyl phosphates may be prepared in the manner illustrated in the following examples:

EXAMPLE I

2-Ethylhexyl diphenyl phosphate

Forty-six grams of $POCl_3$ are cooled with stirring to about 15° C. in a glass lined closed reaction vessel. Thirty-nine grams of 2-ethylhexanol which have been cooled to approximately 15° C. are added to the $POCl_3$ with continuous stirring and at a rate so as to maintain a reaction-mass temperature of about 15° C. The reaction mixture is agitated and the reaction temperature of 15° C. is maintained for one hour following the addition of all the 2-ethylhexanol, thereafter the temperature is allowed to rise to 25° C. and the stirring continued for another hour. The hydrogen chloride gas which is evolved from the reaction is continuously removed by means of applying a vacuum to the reaction vessel. After the reaction between the 2-ethylhexanol and the $POCl_3$ and the removal of the hydrogen chloride have been completed, the reaction mixture containing 2-ethylhexyl phosphoryl dichloride is transferred to a reactor containing 250 g. of an aqueous solution, cooled to 0° C., having a composition of 32% sodium phenate. The 2-ethylhexyl phosphoryl dichloride is added to the aqueous sodium phenate solution at such a rate as to maintain a temperature below 5° C. After all the 2-ethylhexyl phosphoryl dichloride has been added to the aqueous sodium phenate solution, the reaction mixture is agitated for an hour and then, with continuous stirring, allowed to warm up to room temperature. The mixture is then allowed to stand until an ester layer and an aqueous layer form and the crude ester layer is then separated from the aqueous layer. The crude ester is given successive washes with 2% NaOH solution and water thereby removing the unreacted phenol and partial esters, and reducing the alkalinity of the mass until it is acid toto phenolphthalein, and then further refined in accordance with the usual methods well known to those skilled in the art of refining phosphate esters. The yield, based on $POCl_3$, was 91%.

The 2-ethylhexyl diphenyl phosphate prepared in the above manner had the following properties:

| | |
|---|---|
| Sp. gr. 25/25° C. | 1.090 |
| $N_D^{25}$ | 1.510 |
| Boiling point at 5 mm. Hg absolute | approx. 232° C. |
| Melting point | below 0° C. |
| Color | nearly water white |
| Pour point | —65° F. |
| Viscosity —30° F. | 2167 centistokes |
| Viscosity 100° F. | 10.1 centistokes |
| Viscosity 210° F. | 2.46 centistokes |
| Autogenous ignition temperature | 1050° F. |

EXAMPLE II

Nonyl diphenyl phosphate 460.2 g. of $POCl_3$ are cooled with stirring to a temperature of 5 to 10° C. in a glass lined closed reaction vessel. 432.8 g. of a nonyl alcohol (a trimethyl substituted primary hexanol) are cooled to 5 to 10° C. and are added to the $POCl_3$ with continuous stirring and at a rate so as to maintain a reaction-mass temperature of about 15° C. The reaction mixture is agitated and the temperature of the reaction mixture is allowed to come up to room temperature, thereafter the stirring is continued and the reaction mixture is placed under a vacuum (below 50 mm. Hg absolute) over a period of 2 hours thereby removing the hydrogen chloride gas which is evolved from the reaction.

An aqueous solution of sodium phenate is prepared by adding 592.2 g. of phenol to 840 cc. of water having dissolved therein 542.0 g. of 46.5% sodium hydroxide. The aqueous sodium phenate solution is cooled to 0° C. and the nonyl phosphoryl dichloride, prepared by the reaction of the nonyl alcohol and the POCl$_3$, is added to the aqueous sodium phenate solution at such a rate as to maintain a temperature below 5° C. After all of the nonyl phosphoryl dichloride has been added to the aqueous sodium phenate solution, the reaction mixture is agitated for a period of 3 hours and allowed to warm up to room temperature. When the agitation is stopped, the reaction mixture separates into an ester layer and an aqueous layer and the ester layer may be then separated from the aqueous layer by decantation. The ester layer is given successive washes with 2% NaOH solution and water thereby removing the unreacted phenol and partial esters and reducing the alkalinity of the mass until it is acid to phenolphthalein and then further refined in accordance with the usual methods well known to those skilled in the art of refining phosphate esters. The yield, based on POCl$_3$, was 90%.

The nonyl diphenyl phosphate prepared as above described had the following properties:

| | |
|---|---|
| Sp. gr. 25/25° C. | 1.074 |
| $N_D^{25}$ | 1.505 |
| Melting point | below −30° C. |
| Color | nearly water white |

EXAMPLE III

Iso-octyl diphenyl phosphate 153.4 g. of POCl$_3$ are cooled with stirring to about 10° C. in a glass lined closed reaction vessel. 130.2 g. of iso-octyl alcohol (6-methyl-1-heptanol) are cooled to about 10° C. and added to the POCl$_3$ with continuous stirring and at a rate so as to maintain a reaction temperature of 10–14° C. The reaction mixture is continuously agitated and the temperature is gradually increased to 25° C. over a period of about one hour. While the stirring is continued the reaction mixture is placed under a vacuum (below 50 mm. Hg absolute) for another 1½ hours to remove the hydrogen chloride gas which is evolved from the reaction. The reaction mixture now contains predominantly iso-octyl phosphoryl dichloride.

An aqueous sodium phenate solution is prepared by adding 197.5 g. of phenol to 280 cc. of water having dissolved therein 180.7 g. of 46.5% sodium hydroxide. The sodium phenate solution is cooled to about 5° C. and the reaction mixture containing the iso-octyl phosphoryl dichloride is gradually added to the sodium phenate solution at such a rate as to maintain a temperature below 5° C. After all of the iso-octyl phosphoryl dichloride has been added to the sodium phenate solution, the temperature is allowed to rise to about 25° C. and the reaction mixture stirred for an additional 3 hours. When the agitation is stopped, the reaction mixture separates into an ester layer and an aqueous layer and the ester layer is then separated from the aqueous layer by decantation. The ester layer is given successive washes with 2% NaOH solution and water thereby removing the unreacted phenol and partial esters and reducing the alkalinity of the mass until it is acid to phenolphthalein and then further refined in accordance with the usual methods well known to those skilled in the art of refining phosphate esters. The yield, based on POCl$_3$, was 89%.

The iso-octyl diphenyl phosphate prepared as above described had the following properties:

| | |
|---|---|
| Sp. gr. 25/25° C. | 1.093 |
| $N_D^{25}$ | 1.508 |
| Melting point | below −30° C. |
| Color | nearly water white |

EXAMPLE IV

2-Methylpentyl diphenyl phosphate

This ester was prepared by first reacting 102.1 g. of 2-methylpentanol with 153.4 g. of POCl$_3$, in the manner as described for the preparation of 2-ethylhexyl diphenyl phosphate, to form 2-methylpentyl phosphoryl dichloride.

The 2-methylpentyl phosphoryl dichloride was then added to a cooled solution of 440 cc. of water and 243.6 g. of sodium phenate at such a rate as to maintain a reaction temperature below 5° C. After all of the 2-methylpentyl phosphoryl dichloride had been added to the sodium phenate solution, the reaction was finished off and the 2-methylpentyl diphenyl phosphate was recovered and purified in the same manner as was described in the preparation of 2-ethylhexyl diphenyl phosphate. The yield of 2-methylpentyl diphenyl phosphate, based on POCl$_3$, was 88%, and this ester, in appearance, resembled the 2-ethylhexyl diphenyl phosphate.

EXAMPLE V

Decyl diphenyl phosphate

The decyl alcohol used in this example was a branched chain decyl alcohol manufactured from the polymerization product of olefins. While at the time of this application, the exact structure of the branched chain has not been definitely established, the fact that the alcohol does have a 10 carbon atom branched chain primary alcohol structure has been definitely established. These alcohols, generally, are manufactured by polymerizing short chain olefins to form a long chain polymeric olefinic hydrocarbon, reacting this polymer with formaldehyde and hydrogenating the polymer-formaldehyde reaction product to form the alcohol.

76.7 g. of POCl$_3$ were cooled with stirring to about 15° C. in a glass lined closed reaction vessel. 79.2 g. of the above described decyl alcohol were cooled and added to the POCl$_3$ at a rate so as to maintain a reaction temperature of about 15° C. The reaction mixture is continuously agitated and the reaction temperature is allowed to rise to room temperature, thereafter the stirring is continued and the reaction is carried to completion to form the decyl phosphoryl dichloride by placing the reaction mixture under a vacuum (below 50 mm. Hg absolute) over a period of 2 hours, thereby removing the hydrogen chloride gas which is evolved from the reaction.

An aqueous solution of sodium phenate, prepared by adding 98.8 g. of phenol to an alkaline solution of 140 cc. of water and 89.6 g. of 46.5% sodium hydroxide, is cooled to 0° C. and the decyl phosphoryl dichloride is added to the sodium phenate solution at such a rate as to maintain a reaction temperature of about 5° C. After all of the decyl phosphoryl dichloride has been added, the reaction is carried to completion, the ester recovered and purified in the same manner as was described for the preparation of 2-ethylhexyl diphenyl phosphate.

The decyl diphenyl phosphate, prepared as above described, had the following properties:

Sp. gr. 25/25° C_____ 1.066
$N_D^{25}$ _____ 1.504
Melting point _____ below −30° C.
Color _____ nearly water white The yield of decyl diphenyl phosphate, based on $POCl_3$, was 90%.

EXAMPLE VI

2-n-Propylheptyl diphenyl phosphate 2-n-propylheptyl phosphoryl dichloride was prepared by reacting 79.2 g. of 2-n-propylheptanol with 76.7 g. of $POCl_3$ in the manner described for the preparation of decyl phosphoryl dichloride. This 2-n-propylheptyl phosphoryl dichloride was then added to 366 g. of 33.3% sodium phenate solution at a temperature of 0° C. and the reaction carried to completion, the ester recovered and purified in the manner as described for the preparation of decyl diphenyl phosphate. The 2-n-propylheptyl diphenyl phosphate was thus prepared in a yield of 81.5% based on $POCl_3$ and closely resembled the decyl diphenyl phosphate prepared in the previous example.

EXAMPLE VII

2-Butyloctyl diphenyl phosphate 118.5 g. of 2-butyloctanol were cooled to about 20° C. and added to 97.8 g. of $POCl_3$ cooled to approximately 20° C. in a glass lined closed reaction vessel with continuous stirring and cooling so as to maintain a reaction temperature of about 20° C. The reaction mixture is agitated and the temperature is slowly raised to 30 to 40° C. and maintained at that temperature for one hour following the addition of all the 2-butyloctanol; thereafter, temperature is raised to approximately 50° C. and the stirring continued for another hour. The hydrogen chloride gas which is evolved from the reaction is continuously removed by means of applying a vacuum to the reaction vessel.

After the reaction between the 2-butyloctanol and the $POCl_3$ and the removal of the hydrogen chloride have been completed the reaction mixture containing 2-butyloctyl phosphoryl dichloride is transferred to a reactor containing about 420 g. of an aqueous sodium phenate solution, at a temperature below 5° C., prepared from 180 cc. of water, 126.2 g. of phenol and 115.4 g. of 46.5% soda lye. The 2-butyloctyl phosphoryl dichloride is added to the sodium phenate solution at such a rate as to maintain a temperature below 5° C. After all the 2-butyloctyl phosphoryl dichloride has been added to the sodium phenate solution, the reaction mixture is agitated for an hour and then with continuous stirring the temperature is gradually raised to 30° C. The reaction mixture is then allowed to stand until an ester layer and an aqueous layer form and the crude ester layer is separated from the aqueous layer. The separation of the 2-butyloctyl diphenyl phosphate from the aqueous solution is not always sharp and, therefore, it is usually desirable to add sodium chloride to the reaction mixture to aid in the salting out of the ester. The crude ester is given successive washes with NaOH solution and water thereby removing the unreacted phenol and partial esters, and reducing the alkalinity of the mass until it is acid to phenolphthalein, and then further refined in accordance with the usual methods well known to those skilled in the art of refining phosphate esters. The yield, based on $POCl_3$, was 85%.

EXAMPLE VIII

2-Ethylbutyl diphenyl phosphate 2-ethylbutyl phosphoryl dichloride was prepared by adding 51.1 g. of 1-ethylbutanol to 76.7 g. of phosphorous oxychloride, cooled to 10° C., with continuous stirring and cooling and at such a rate as to maintain a reaction temperature of 10 to 15° C. The reaction mixture is held at 15° C. for one hour following the addition of the 2-ethylbutanol and thereafter the reaction temperature is raised to 25° C. and the reaction thereafter continuously stirred and held under 30 mm. Hg absolute vacuum (to remove the HCl evolved) for an additional hour to complete the formation of the 2-ethylbutyl phosphoryl dichloride.

The 2-ethylbutyl phosphoryl dichloride was reacted with an aqueous sodium phenate solution cooled to 0° C. and prepared by adding 98.8 g. of phenol to 140 cc. of water having dissolved therein 90.4 g. of 46.5% soda lye. The 2-ethylbutyl phosphoryl dichloride is added at a rate so as to maintain a reaction temperature below 5° C. and after all of the 2-ethylbutyl phosphoryl dichloride had been added, the reaction is finished off and the ester recovered and purified in the manner described for the preparation of 2-ethylhexyl diphenyl phosphate. The yield of 2-ethylbutyl diphenyl phosphate, based on $POCl_3$, was 89%, and the ester, in general appearance, closely resembled 2-methylpentyl diphenyl phosphate.

EXAMPLE IX

Tridecyl diphenyl phosphate 120.1 g. of a 13 carbon branched chain primary alcohol prepared from the polymerization products of olefins were cooled to about 20° C. and added to 92.0 g. of $POCl_3$ cooled to about 20° C. in a glass lined closed reaction vessel with continuous stirring and cooling so as to maintain a reaction temperature of about 20° C. The reaction mixture was agitated and the temperature slowly raised to 30° to 40° C. and maintained at that temperature for one hour following the addition of all the tridecyl alcohol. The temperature was then raised to about 50° C. and the stirring continued for another hour. The hydrogen chloride gas which was evolved from the reaction was continuously removed by means of applying a vacuum to the reaction vessel.

158.9 g. of the above prepared tridecyl phosphoryl dichloride were transferred to a reactor containing about 325 g. of an aqueous sodium phenate solution, at a temperature below 15° C., prepared from 140 cc. of water, 98.8 g. of phenol and 87.0 g. of 48.3% sodium hydroxide. The tridecyl phosphoryl dichloride was added to the sodium phenate solution at such a rate as to maintain a temperature between 11° and 14° C. After all the tridecyl phosphoryl dichloride had been added to the sodium phenate solution, the reaction was carried to completion. The reaction mixture was then allowed to stand until an ester layer and an aqueous layer formed and the ester layer was separated from the aqueous layer. The ester was given successive washes with NaOH solution and water and then dehydrated under vacuum at 100° C. The yield, based on POCl₃, was 88.8%.

The tridecyl diphenyl phosphate prepared in the above manner, had the following properties:

Sp. gr. 25/25° C _____ 1.0440
$N_D^{25}$ _____ 1.5014
Pour point _____ −45° F.
Color _____ Nearly water white
Viscosity at 100° F _____ 97.37 Saybolt Universal seconds
Viscosity at 210° F _____ 38.77 Saybolt Universal seconds

EXAMPLE X

Tetradecyl diphenyl phosphate 76.7 g. of POCl₃ were cooled with stirring to a temperature of 5° to 10° C. in a glass lined closed reaction vessel. 107.1 g. of a 14 carbon branched chain primary alcohol prepared from the polymerization products of olefins were cooled to 5° to 10° C. and added to the POCl₃ with continuous stirring at a rate so as to maintain a reaction mass temperature of about 15° C. The reaction mixture was agitated and the temperature of the reaction mixture allowed to come up to room temperature, thereafter the stirring was continued and the reaction mixture placed under a vacuum (below 50 mm. Hg absolute) over a period of 2 hours thereby removing the hydrogen chloride gas which was evolved during the reaction.

An aqueous solution of sodium phenate was prepared by adding 79.0 g. of phenol to 130 cc. of water having dissolved therein 69.7 g. of 48.3% sodium hydroxide. The aqueous sodium phenate solution was cooled to about 5° C. and 132.5 g. of the above prepared tetradecyl phosphoryl dichloride was added to the aqueous sodium phenate solution over a period of about two hours and at such a rate as to maintain a temperature between 5° and 15° C. After all of the tetradecyl phosphoryl dichloride was added the reaction was taken to completion and then allowed to stand and separate into an ester layer and an aqueous layer. The ester layer was removed and given successive washes with a 2% NaOH solution and water and then dehydrated under vacuum at about 100° C. The yield, based on POCl₃, was 87.1%.

The tetradecyl diphenyl phosphate prepared as above described had the following properties:

Sp. gr. 25/25° C _____ 1.0382
$N_D^{25}$ _____ 1.5007
Pour point _____ −40° F.
Color _____ Nearly water white
Viscosity at 100° F _____ 106.82 Saybolt Universal seconds
Viscosity at 210° F _____ 39.31 Saybolt Universal seconds

EXAMPLE XI

Octadecyl diphenyl phosphate

The octadecyl alcohol used in this example was 2-(1,3,3-trimethylbutyl)-5,7,7-trimethyl-1-octanol prepared from the polymerization products of olefins.

76.7 g. of POCl₃ were cooled with stirring to about 25° C. in a glass lined closed reaction vessel. 135.5 g. of the above described octadecyl alcohol were cooled and added to the POCl₃ at a rate so as to maintain a reaction temperature of about 25° C. The reaction mixture was continuously agitated and the temperature allowed to rise to room temperature and maintained at this temperature for an additional one hour stirring period during which time the hydrogen chloride gas evolved during the reaction was removed by means of applying a vacuum (below 30 mm. Hg absolute) to the reaction vessel.

The octadecyl phosphoryl dichloride was then transferred to a reactor containing an aqueous sodium phenate solution cooled to 25° C. and prepared by adding 98.7 g. of phenol to 139 cc. of water having dissolved therein 90.5 g. of 46.5% sodium hydroxide. The octadecyl phosphoryl dichloride was added to the aqueous sodium phenate solution at such a rate as to maintain a temperature below 30° C. After all the octadecyl phosphoryl dichloride was added the reaction mixture was stirred for an additional three hours allowing the mixture to come to room temperature. On standing the reaction mixture separated into an aqueous layer and an ester layer. The ester layer was removed and given successive washes with 2% NaOH solution and water and finally dehydrated under vacuum at about 110° C. The yield of octadecyl diphenyl phosphate, based on POCl₃, was about 87%.

The novel monoalkyl diphenyl phosphates of this invention possess many outstanding and unexpected properties, permitting their utility in many new and varied applications. A most significant, outstanding and unexpected property of the novel phosphate esters of this invention is their substantial non-toxicity. This non-toxicity permits a safe and more widely diversified use of these phosphate esters, particularly as plasticizers for synthetic resins where the use of formerly known phosphate esters, such as tricresyl phosphate and triphenyl phosphate required consideration of the toxicity factor. Indicative of the behavior of the novel phosphate esters of this invention is the toxicity of 2-ethylhexyl diphenyl phosphate which has been tested for acute and sub-acute or oral toxicity in two species of animals. Amounts up to 24 ml. (26.2 g.) per kilogram of body weight were administered to rats and rabbits without any symptoms or evidence of systemic toxicity. Eight ml. (8.7 g.) per kilogram of body weight were administered daily for a month without any ill effects. Moreover, 2-ethylhexyl diphenyl phosphate does not appear to exert any cumulative effect.

With respect to toxicity, 2-ethylhexyl diphenyl phosphate is considerably different from other phosphate esters, particularly the triaryl phosphates such as tricresyl phosphate and triphenyl phosphate. The lethal dose of tricresyl phosphate varies; however, it is definitely of the order of one gram per kilogram of body weight. In addition, tricresyl phosphate exerts a very striking cumulative effect. The lethal dose of triphenyl phosphate likewise varies with the species of animals subjected to the toxicity tests; however, the toxicity of triphenyl phosphate is of the order of 0.2 to 0.3 gram per kilogram of body weight for cats and mice.

It is apparent from the foregoing that 2-ethylhexyl diphenyl phosphate is substantially non-toxic, and that this outstanding property was quite unexpected and unpredictable in view of the known toxicity of the triaryl phosphates.

Another very significant, outstanding and unexpected physical property of the monoalkyl diphenyl phosphates of this invention is their outstanding hydrolytic stability. It has been found that the novel branched chain alkyl diphenyl phosphate esters of this invention possess an outstanding hydrolytic stability which permits the preparation of exceptionally stable plasticized polyvinyl chloride compositions and exceptionally stable functional fluids such as hydraulic and torque converter fluids. The unexpected nature of this outstanding physical property is made evident by a comparison of the hydrolytic stability of the novel branched chain diphenyl phosphate esters of this invention with the isomeric straight chain alkyl diphenyl phosphate esters.

In determining the hydrolytic stability of the phosphate esters, 10 g. of the ester to be tested and 100 ml. of freshly boiled, distilled water were placed in a round bottomed flask and refluxed for 24 hours. The mixture was then allowed to cool and was titrated with N/10 sodium hydroxide using thymol blue indicator. The titration was corrected for the acidity present in the starting materials as determined by a blank. The amount of N/10 sodium hydroxide is a measure of the hydrolysis that occurred during the refluxing. The following table sets forth the hydrolytic stability of phosphate esters so evaluated:

| Phosphate Ester | Ml. N/10 NaOH per mole |
|---|---|
| 2-Ethylbutyl diphenyl phosphate | 48.2 |
| n-Hexyl diphenyl phosphate | 160 |
| 2-Ethylhexyl diphenyl phosphate | 35.5 |
| Iso-octyl diphenyl phosphate | 75.2 |
| n-Octyl diphenyl phosphate | 146 |
| Decyl diphenyl phosphate [1] | 96.7 |
| n-Decyl diphenyl phosphate | 160 |

[1] The decyl radical in this phosphate ester was derived from a mixture of 2-ethyl-1-octanol and 2-butyl-1-hexanol.

The preceding table is indicative of the superiority of the novel monoalkyl diphenyl phosphates of this invention. The outstanding superiority of the hydrolytic stability of these novel esters, even as compared to their straight chain isomers, is clearly unexpected and unpredictable. Heretofore phosphate esters had limited utility because of what was believed to be their inherently poor hydrolytic stability. Hence, the phosphate esters heretofore known could not be utilized to any practical degree of satisfaction in plasticized polyvinyl chloride compositions which were destined to be subjected to prolonged and continued exposure to elevated temperatures in the presence of moisture. Similarly, the esters heretofore known could not be utilized to any practical degree as functional fluids as the hydrolytic instability of these materials at elevated temperatures caused the formation of acidic materials which corroded the standard equipment utilized in such applications. As a result of this invention, however, a new class of outstandingly stable phosphate esters is now disclosed, having utility in many fields wherein the phosphate esters heretofore known had no practical utility.

The novel esters of this invention are further unique, as compared to the isomeric straight chain alkyl diphenyl phosphates, in that the esters throughout the entire range are liquids at ordinary temperatures whereas the straight chain alkyl diphenyl phosphates, as the length of the alkyl group approaches 18 carbon atoms, are solids or tend to solidify at ordinary temperatures. Because of this physical property, the novel phosphate esters of this invention find utility in many applications wherein the straight chain alkyl diphenyl phosphate esters have little or no utility.

This application is a continuation-in-part of copending application Serial No. 373, filed January 2, 1948, now abandoned, which was a continuation-in-part of application Serial No. 720,310, filed January 4, 1947, now abandoned.

What is claimed is:

1. As new chemical compounds, the monoalkyl diphenyl phosphate esters, having the formula

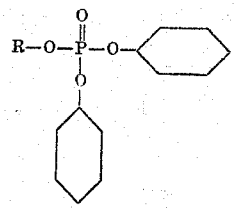

wherein R represents a branched chain alkyl radical terminating with a $CH_2$ group and containing at least 6 and not more than 18 carbon atoms.

2. As new chemical compounds, the monoalkyl diphenyl phosphate esters, having the formula

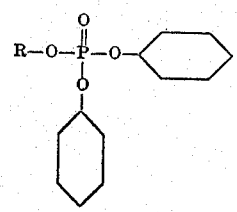

wherein R represents a branched chain alkyl radical, derived from a branched chain primary alcohol, containing at least 6 and not more than 18 carbon atoms.

3. As new chemical compounds, the monoalkyl diphenyl phosphate esters wherein the alkyl radical is a branched chain alkyl radical terminating with a $CH_2$ group and containing 8 carbon atoms.

4. 2-ethylhexyl diphenyl phosphate.

5. 6-methylheptyl diphenyl phosphate.

6. As a new chemical compound, the monoalkyl diphenyl phosphates wherein the alkyl group is a branched chain alkyl radical terminating with a $CH_2$ group and containing 6 carbon atoms.

7. 2-methylpentyl diphenyl phosphate.

8. As new chemical compounds, the monoalkyl diphenyl phosphates wherein the alkyl group is a branched chain alkyl radical terminating with a $CH_2$ group and containing 9 carbon atoms.

9. Trimethylhexyl diphenyl phosphate.

10. As new chemical compounds, the monoalkyl diphenyl phosphates wherein the alkyl group is a branched chain alkyl radical terminating with a $CH_2$ group and containing 12 carbon atoms.

11. 2-butyloctyl diphenyl phosphate.

HARRY R. GAMRATH.
JOHN KENNETH CRAVER.

REFERENCES CITED

The following references are of record in the file of this patent:

UNITED STATES PATENTS

| Number | Name | Date |
|---|---|---|
| 2,005,619 | Graves | June 18, 1935 |
| 2,406,802 | Carruthers | Sept. 3, 1946 |